Dec. 1, 1936.      H. RUPPE      2,062,938
PERMANENT MAGNET FOR SMALL ELECTRICAL MACHINES
Filed Nov. 15, 1935
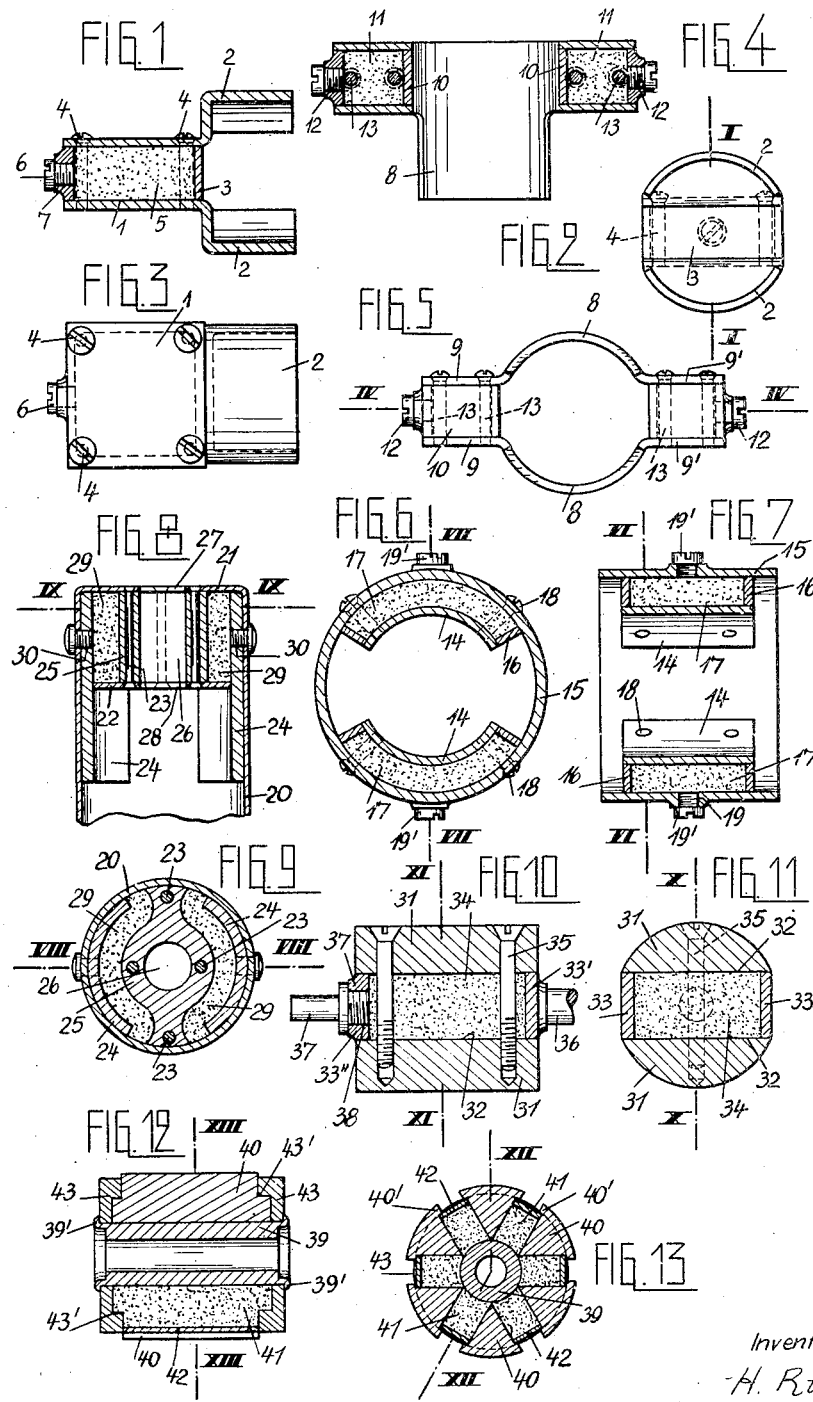
Inventor:
H. Ruppe
by:
Hancock Downing & Seebold
Attorneys Patented Dec. 1, 1936

2,062,938

UNITED STATES PATENT OFFICE 2,062,938

PERMANENT MAGNET FOR SMALL ELECTRICAL MACHINES

Hugo Ruppe, Berlin, Germany, assignor to Ernst Gross, Berlin, Germany

Application November 15, 1935, Serial No. 50,030 In Germany November 29, 1934

5 Claims. (Cl. 171—252)

The invention relates to a permanent magnet of the field or armature type for electrical machines, such as small electro-motors and small dynamos, consisting of a highly magnetic material, such as an aluminum, nickel and steel alloy, which is employed in a more or less finely disintegrated form for the production of the magnet.

In a permanent magnet produced by the use of a disintegrated magnetic steel material of this nature it is a primary feature of the invention that the magnet comprises one or more chambers, which are filled with the disintegrated magnetic steel material, and the walls of which are constituted partly by pole shoes and partly by a non-magnetic material. Permanent magnets produced in this fashion possess a high magnetic efficiency and at the same time may be produced readily and quickly at comparatively low cost without the magnetic steel material itself calling for any kind of treatment which might be difficult to perform.

According to the invention, permanent magnets both of the field and the armature type may be produced in numerous different forms, all of these, however, revealing the feature above referred to.

In the drawing there are shown several possible forms of embodiment of permanent magnets according to the invention, but it will be understood that these are intended solely for the purpose of illustration, and that the invention is in no way limited thereto.

Fig. 1 is a cross-section along the line I—I in Fig. 2,

Fig. 2 is an end elevation, and

Fig. 3 is a side elevational view of one form of embodiment of a field magnet according to the invention.

Figs. 4 and 5 show respectively in section along the line IV—IV in Fig. 5 and in plan a modified form of embodiment of a field magnet according to the invention, and Figs. 6 and 7 show in two sections along the lines VI—VI in Fig. 7 and VII—VII in Fig. 6 a further form of embodiment.

Fig. 8 is a longitudinal section of another modification according to the line VIII—VIII in Fig. 9, and Fig. 9 a cross-section along the line IX—IX in Fig. 8 of a further form of embodiment of a field magnet.

Figs. 10 and 11 show sections along the lines X—X in Fig. 11 and XI—XI in Fig. 10 of a permanent magnet of the armature type, while Figs. 12 and 13 show in two sections along the lines XII—XII in Fig. 13 and XIII—XIII in Fig. 12 an additional form of embodiment of an armature-type magnet according to the invention.

The field magnet for a small electro-motor as illustrated in Figs. 1, 2 and 3 possesses two pole shoes, each consisting of a flat plate-like member 1 of square or rectangular form and an outwardly set-off portion 2 of segmental form. The pole shoes 1, 2, 1, 2 are spaced with their flat portions 1 opposite to each other a short distance apart, and between these parts 1, 1 of the pole shoes there is situated a frame or sleeve 3 composed of brass or other non-magnetic material, such as aluminum or pressed material, of a form adapted to the form of the pole-shoe members 1, it being obvious that the frame 3 may also be composed of single walls. The pole shoes 1, 2, 1, 2 are connected with the frame 3 by the brass bolts 4 to form an integral whole, which has a block-shaped hollow space 5 of rectangular cross-section and small height. One of the outlying walls of the frame 3 is provided with a filling aperture 7 which is closed by means of a screw 6. In the form of embodiment shown the disintegrated magnetic material is introduced through this aperture 7 into the space 5, and it is accomplished, for example by shaking the magnet steel during the filling operation, that the disintegrated magnetic steel material is packed in the space 5 in extremely compact form, whereby a complete filling-out of the space 5 by the disintegrated magnetic material may be additionally assisted by alternately filling coarse and fine material into the space 5, so that the finer pulverulent material fills out the interstices between the more granular material. After the magnet has been completed it possesses a very high magnetic force. The space between the pole-shoe portions 2, 2 is adapted to receive the armature of the electro-motor.

Instead of filling the disintegrated magnetic steel material into the space 5 in the manner described, it may also be pressed into this space with the assistance of a binding agent, such as synthetic resin, so that after the packing operation it constitutes a unitary element. Naturally care then requires to be taken that the frame 3 possesses in place of the filling aperture 7 a larger aperture, through which the disintegrated magnetic steel material may be pressed into the space 5 by means of suitable pressing or ramming tools.

The form of embodiment of the field magnet illustrated in Figs. 4 and 5 also possesses two segmental pole shoes 8, 8, each having one, or two, lateral abutments, two of these 9, 9' being shown in the drawing. The two pole shoes, as disclosed more particularly by Fig. 5, are so arranged in relation to each other that the lateral abutments of the two pole shoes 8 are situated opposite to each other at a short distance apart.

Between the lateral abutments of the two pole shoes 8 there is again provided, in each case, a frame 10 composed of brass or other non-magnetic material, such as aluminum, and the hollow spaces 11, 11 formed between the pole shoes of these frames 10 are again closed by means of two filling screws 12. The two pole shoes with the intermediately disposed frames 10 are held together by means of brass rivets or bolts 13. The hollow spaces 11, 11 serve to accommodate the disintegrated magnetic steel material. If the pole shoes 8, 8 have abutments only on the one side, the finished magnet also has merely one chamber 11 filled with the disintegrated magnetic steel material.

The hollow space between the segmental portions 8, 8 of the pole shoes, serves to receive the armature of the motor.

The field magnet illustrated in Figs. 6 and 7 also possesses two segmental pole shoes 14, 14. These pole shoes 14, 14 are arranged at a certain distance from the inner wall of a ring or hollow cylindrical member 15 composed of iron, and between each pole shoe 14 and the oppositely disposed section of the iron ring 15 there are again provided frames 16 composed of brass or another suitable non-magnetic material, so that the magnet frame possesses two segmental chambers 17, 17, which are confined partly by the pole shoes 14 and partly by the walls of the frame 16. Pins or bolts 18 passing through the ring 15 serve to connect the pole shoes 14 and the frame 16 rigidly with the ring 15. In the ring 15 there are provided two filling apertures 19, which are closed by means of screws 19', and through which the disintegrated magnetic steel material may be filled into the segmental chambers 17. The inner space between the pole shoes 14 of the magnet is adapted to receive the armature.

In Figs. 8 and 9 there is shown a field magnet possessing an outer pot-like sleeve 20 composed of brass or other non-magnetic material and open at the one end, its end wall being designated 21. A comparatively short distance below the end wall 21 there is provided within the sleeve 20 an intermediate disc or partition 22, which is also composed of brass and is rigidly connected with the end wall 21 of the sleeve 20 by rivets or bolts 23. Along the inner wall of the sleeve 20 there are arranged rod-like pole shoes 24 of segmental cross-section, which engage through corresponding marginal recesses in the partition 22 into the hollow space between the partition 22 and the end wall 21 and project with their lower ends beyond the partition 22, as shown clearly in Fig. 8. The pole shoes 24 are secured to the sleeve 20 in any suitable fashion.

Within the hollow space, on the end wall of the sleeve 20, there is also provided between the pole shoes an intermediate bridge-like member 25 of soft iron, which bears with its two ends against the inner wall of the sleeve 20 and agrees in height with the spacing between the two walls 21, 22, and which is traversed by the connecting bolts 23 and is furnished at the centre with an aperture 26 situated opposite to corresponding apertures 27 and 28 respectively in the end portion 21 and the partition 22. The intermediate iron member 25, as shown more particularly in Fig. 9, possesses an outer profile of such nature that all of the lines of force proceeding from the pole shoes 24, 24 possess the same length up to their entry into the intermediate member 25. The magnet frame shown in Figs. 8 and 9 accordingly possesses between the pole shoes 24, 24 and the intermediate member 25 closed sickle-shaped chambers 29, 29, which serve to receive the filling of disintegrated magnetic steel material, which may be filled into the chambers 29, 29 through the filling-in apertures 30, 30, which are capable of being closed and, in the particular form of embodiment concerned, pass through the sleeve 20 and the pole shoes 24.

The hollow space between the lower parts of the pole shoes 24, 24 serves to accommodate the armature of a small electro-motor, the boring 27, 26, 28, which may be lined with a bearing brass, being utilized to receive the shaft of the armature.

A permanent magnet constructed in accordance with Figs. 8 and 9 has a particularly high efficiency, as in the case thereof the lines of force within the disintegrated magnetic steel material are always short in length, which has been found to be particularly desirable.

In Figs. 10 and 11 there is shown a permanent magnet of the armature type. This magnet possesses two pole pieces 31, 31, which consist of sections of a complete cylinder, i. e., as shown in Fig. 11, possess a segmental cross-section. These pole pieces 31, 31 are arranged with their flat bases 32, 32 a certain distance apart, and the space between the two pole pieces 31, 31 is closed off towards the outside by a frame or casing 33 composed of brass or other non-magnetic material, as shown in Figs. 10 and 11, so that between the pole pieces 31, 31 there is formed a closed member 34 of comparatively small height, which chamber conveniently possesses a rectangular cross-section. The brass screws 35 hold the parts 31, 31 and 33 of the magnet frame together.

The one transverse wall 33' of the frame is furnished with a shaft 36, while in the opposite transverse wall 33" of the frame 34 there is fitted by means of a thread a trunnion 37 which is constructed at its end as a screw. The threaded orifice 38 of the trunnion 37 also acts at the same time as filling aperture for filling the disintegrated magnetic steel material into the space 34.

In Figs. 12 and 13 there is shown a permanent magnet of the armature type having a plurality of, for example six, poles. This magnet comprises an inner sleeve 39, for example of brass, adapted to receive the armature shaft, and also six rod-like pole pieces 40 of substantially triangular form.

The pole pieces 40 are arranged in such fashion radially to the sleeve 39 that between each two pole pieces 40 there is formed an elongated hollow space 41 of rectangular cross-section, these hollow spaces serving to accommodate the disintegrated magnetic steel material. The hollow spaces 41 are closed off towards the inside by means of the outer jacket surface of the sleeve 39, while for the outer confinement of the spaces there are employed strip-like cover members 42 preferably composed of a plastic insulating substance. After the filling of the spaces 41 with the disintegrated magnetic material these cover members 42 are inserted between the pole pieces 40 from the side, the pole pieces engaging over the strips 42 by means of projections 40' at their outer ends. The lateral closure of the armature is constituted by two discs 43 consisting of a pressed insulating material or linen or a similar material impregnated with synthetic resin, which discs for the purpose of holding the pole pieces 40 engage with abutments 43' into recesses in the pole pieces, as shown clearly in Fig. 12. For the purpose of holding all parts of the magnet frame together the outer edges 39' of the sleeve 39 are folded over the discs 43.

What I claim as new and desire to secure by Letters Patent is:

1. A permanent magnet for small electrical machines, comprising pole shoes, parts composed of non-magnetic material forming together with the said pole shoes at least one chamber, and a filling of disintegrated magnetic steel material in the said chamber.

2. In a permanent magnet for small electrical machines, two pole shoes which are flat at the one end and of segmental form at the opposite end, a frame composed of non-magnetic material and having a rectangular cross-section disposed between the flat ends of the said pole shoes and forming together therewith at least one chamber, and a filling of disintegrated magnetic steel material in the said chamber.

3. In a permanent magnet for small electrical machines, two pole shoes, a frame composed of non-magnetic material disposed between the said pole shoes and forming together therewith at least one chamber, and a filling of disintegrated magnetic steel material in the said chamber, the said frame having a filling aperture for filling in the said disintegrated material after the remaining parts of the magnet have been assembled.

4. In a permanent magnet for small electrical machines, two pole shoes, at least one lateral abutment to each pole shoe, a frame composed of non-magnetic material disposed between each pair of abutments and forming together therewith at least one chamber, and a filling of disintegrated magnetic steel material in the said chamber.

5. In a permanent magnet for small electrical machines, an iron ring, two segmental pole shoes disposed within the said ring in certain spatial relation thereto, lateral frames composed of a non-magnetic material, and a filling of disintegrated magnetic steel material in the chambers formed by the frames, the ring and the said pole shoes.

HUGO RUPPE.